April 9, 1940.   H. T. FAUS   2,196,898
ELECTRIC INTEGRATING DEVICE
Filed May 12, 1938   3 Sheets-Sheet 1

NEGATIVE TEMPERATURE
COEFFICIENT OF
PERMEABILITY MATERIAL

MAGNETIZING
ARRANGEMENT

Inventor:
Harold T. Faus,
by Harry E. Dunham
His Attorney.

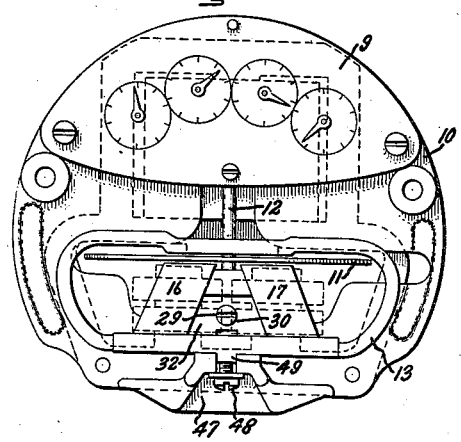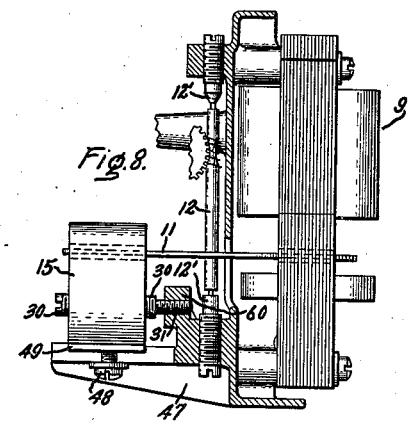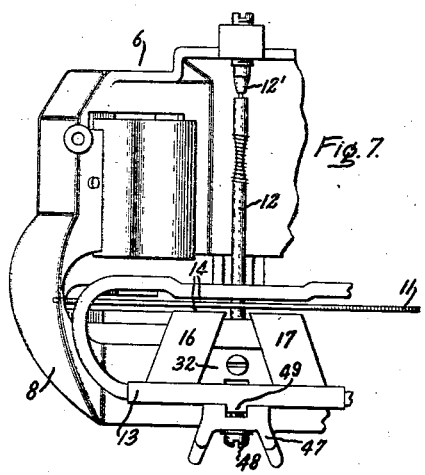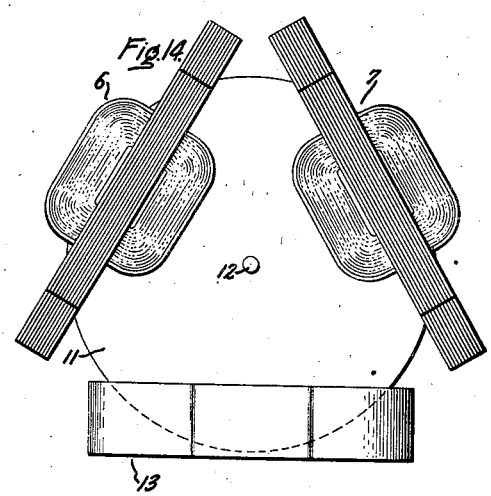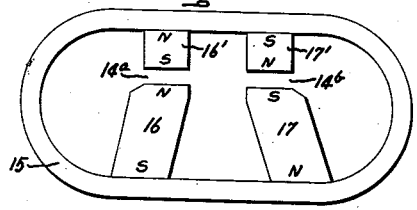

April 9, 1940. H. T. FAUS 2,196,898
ELECTRIC INTEGRATING DEVICE
Filed May 12, 1938 3 Sheets-Sheet 3
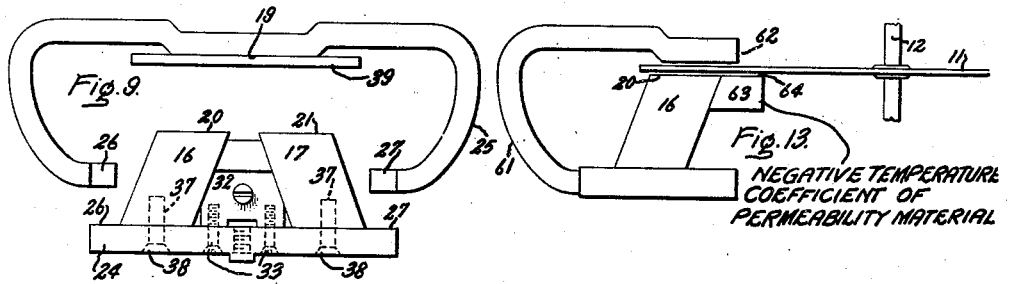
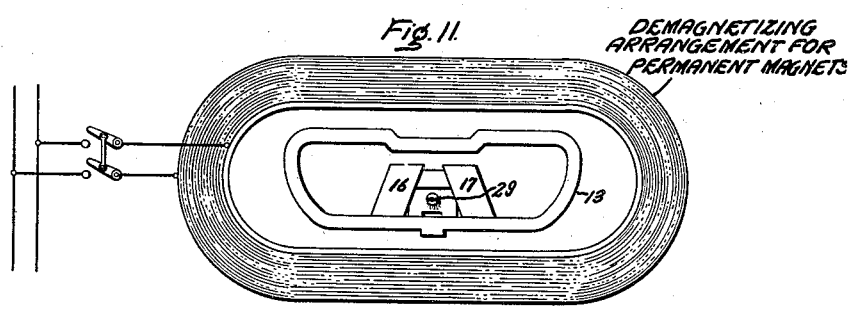
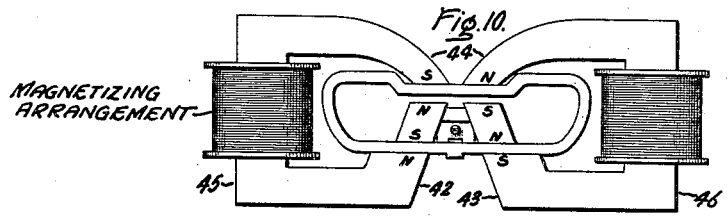
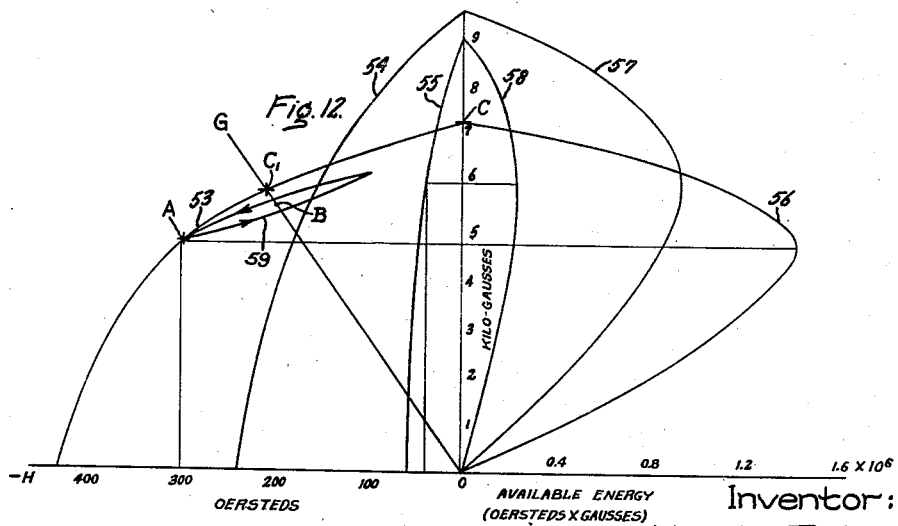
Inventor:
Harold T. Faus,
by Harry E. Dunham
His Attorney.

Patented Apr. 9, 1940

2,196,898

UNITED STATES PATENT OFFICE 2,196,898

ELECTRIC INTEGRATING DEVICE

Harold T. Faus, Lynn, Mass., assignor to General Electric Company, a corporation of New York Application May 12, 1938, Serial No. 207,534

11 Claims. (Cl. 171—264)

My invention relates to rotating disc apparatus such as watt-hour meters and concerns particularly such devices with improved damping magnet systems.

It is an object of my invention to provide rotating disc integrating devices of high reliability, and continued accuracy.

Another object of my invention is to provide a compact, efficient damping magnet system for rotating disc apparatus and an improved rapid, economical method of accurately manufacturing such damping magnet systems.

Another object of my invention is to provide a damping magnet accurately retaining its magnetic strength with great permanency.

It is also an object of my invention to provide a damping magnet which is unaffected by stray magnetic fields which may be produced either by apparatus unrelated to the watt-hour meter with which the damping magnet is used, or which may be produced by the coils of the watt-hour meter itself in case of heavy overloads or other disturbances.

It is a further object of my invention to provide a construction for damping magnet systems in which temperature correction of a watt-hour meter may readily be applied.

Still another object of my invention is to provide a construction in which the permanent magnets may be magnetized conveniently, efficiently, and rapidly with a minimum of expense.

Other and further objects and advantages will become apparent as the description proceeds.

In carrying out my invention in its preferred form I provide a rotating disc watt-hour meter having a damping magnet system consisting of a yoke of low coercive force relatively permeable magnetizable material and a pair of permanent magnets. The yoke is preferably in the form of an elongated or flattened closed loop. The permanent magnets are short bars composed of high coercive force magnetic material extending transversely within the loop, having the pole faces at one end in contact with the inner surface of one side of the closed loop, and having the pole faces at the other end spaced from the opposite inner surface of the closed loop to provide air gaps in which the rotating disc of the watt-hour meter or the like may travel.

Figure 1:
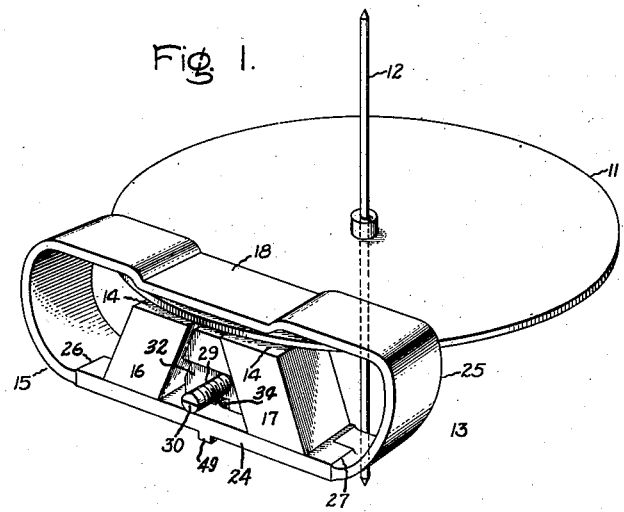
Figure 2:
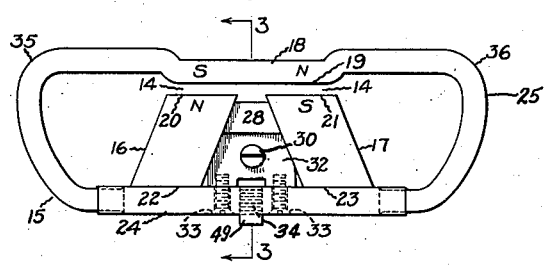
Figure 3:
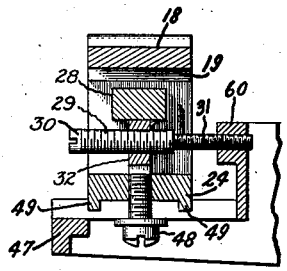
Figure 4:
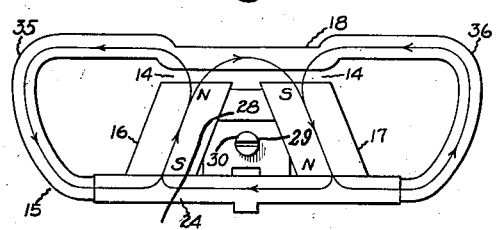
Figure 5:
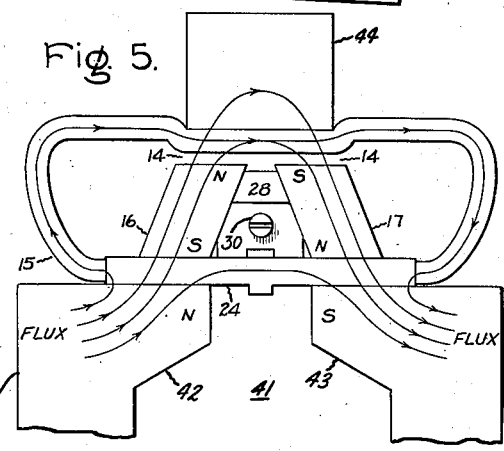

The invention may be understood more readily from the following detailed description when considered in connection with the accompanying drawings and those features of the invention which are believed to be novel and patentable will be pointed out in the claims appended hereto. In the drawings Figure 1 is a perspective view of a rotatable disc such as a watt-hour meter disc and a damping magnet constructed in accordance with one embodiment of my invention. Fig. 2 is a front elevation of the damping magnet of Fig. 1. Fig. 3 is a view of a cross section cut by a plane 3—3 indicated in Fig. 2. Fig. 4 is an outline diagram corresponding to Fig. 2 but showing the paths of the magnetic flux after the damping magnet has been magnetized. Fig. 5 is an outline diagram illustrating the method of magnetizing the damping magnet showing the paths of magnetic flux during the magnetizing operation. Fig. 6 is a front view of a single-element single-phase watt-hour meter forming an embodiment of my invention. Fig. 7 is a partial front view of a two-element polyphase watt-hour meter forming another embodiment of my invention. Fig. 8 is a side view of the apparatus of Fig. 6. Fig. 9 is a diagram illustrating a method of manufacturing the damping magnet systems illustrated in the foregoing figures. Fig. 10 is a diagram of an alternative arrangement for magnetizing the permanent magnets. Fig. 11 is a diagram of an arrangement for demagnetizing the magnets for stability. Fig. 12 is a graph showing portions of the hysteresis curves and the energy product curves for various permanent magnet materials. Fig. 13 is a front view of an inexpensive form of a damping magnet system embodying my invention. Fig 14 is a plan view of the embodiment of Fig. 7. Fig. 15 is a front view of a modified damping magnet system. Like reference characters are utilized throughout the drawings to designate like parts.

In the drawings I have illustrated embodiments of my invention in the form of watt-hour meters, although it will be understood that the damping magnet system comprised therein may be utilized also in other types of rotating disc apparatus. In Fig. 6 is shown a single-phase watt-hour meter having a single driving unit 9, supported by a cast iron frame 10, and in Figs. 7 and 14 is shown a polyphase watt-hour meter having a pair of driving units 6 and 7 placed in angular relation and mounted upon an aluminum frame 8. In either type of watt-hour meter there is a rotating disc 11 cooperating with the driving units. The rotating discs may be of the same type for single-phase or polyphase watt-hour meters although preferably in the case of the multi-unit watt-hour meter of Fig. 14 a laminated overlapping-sector type of induction disc is employed such as described in German Patent No. 433,189 and also in United States Patent No. 2,110,417 to Green. The rotating disc 11 is carried by a vertical spindle 12 having pivots at the ends thereof cooperating with bearings 12' supported by the meter frame 8 or 10. For the purpose of providing a damping torque which increases in strength substantially in proportion to the speed of the disc 11, a damping magnet or drag magnet system 13 is provided having a pair of air gaps 14 into which the disc 11 extends. The same damping magnet system may be utilized for either the single element watt-hour meter of Fig. 6 or the multi-element watt-hour meter of Fig. 7. For the sake of clarity the rotating disc and damping magnet system alone are shown in Fig. 1.

The damping magnet 13 comprises a yoke composed of low coercive force material in the form of an integrally formed closed loop 15 and a pair of permanent magnets 16 and 17 which are relatively short in comparison with their cross sectional area and in comparison with the length of the air gap 14, and which are composed of a high coercive force material. The yoke or loop 15 is preferably elongated and has its top and bottom sides flattened. The central portion 18 of the top side of the loop 15 may be depressed somewhat in order that the inner surface 19 may form a plane surface confronting the pole faces 20 and 21 of the permanent magnets 16 and 17, and in order to concentrate the air gap flux within the area substantially equal to the area of the pole faces 20 and 21. The pole faces 22 and 23 at the lower ends of the magnets 16 and 17 respectively, are secured to the inner surface of the lower flattened side 24 of the loop 15.

The closed loop 15 may, if desired, be formed by bending a long flat strip 25 into the shape shown and providing a shorter straight strip 24 with ends meeting the ends of the strip 25. The adjacent ends 26 and 27 of the strips 24 and 25 may be stepped to facilitate assembly and formation of a joint, which is preferably made by welding or in some other suitable manner resulting in an integral mechanical structure and an uninterrupted magnetic circuit.

The front and rear surfaces of the permanent magnets 16 and 17 may be shaped as oblique parallelograms so that the magnets incline toward each other at the upper end. For the purpose of providing temperature compensation of a watt-hour meter with which the damping magnet 13 is to be used a trapezoidal-shaped compensating shunt 28 may be provided with its end faces in contact with the inner surfaces at the upper ends of the magnets 16 and 17. The compensating shunt 28 may be composed of a material having a negative temperature coefficient of permeability such as that disclosed, for example, in United States Patent No. 1,706,172 to Kinnard. Such material may have a composition of from 40 to 20% copper, 60 to 81% nickel, and approximately 2% iron.

Although I am not limited to a specific composition of the material composing the permanent magnets 16 and 17, I have found that satisfactory results may be obtained by utilizing one of the alloys in which iron, nickel, and aluminum predominate in the order named since these materials have such a high coercive force as to produce permanent magnets, the most efficient shape of which is realized when the ratio of length to cross sectional area is comparatively small. For example I have found that one of the following compositions may satisfactorily be employed.

| Grade | Composition | | | | | | Magnetic properties | |
|---|---|---|---|---|---|---|---|---|
|  | Ni | Al | Co | Cu | Fe | Si | Hc | Bx |
| 1 | 20 | 12 | 5 | 0 | 63 | 0 | 440 | 7000 |
| 2 | 17 | 10 | 12 | 6 | 55 | 0 | 600 | 7500 |
| 3 | 25 | 13 | 0 | 0 | 62 | 0 | 440 | 7000 |
| 4 | 30 | 12 | 0 | 0 | 57 | .75 | 700 | 5300 |

The compositions given are in percentages. The values of magnetic properties in the column under the heading Hc represent the coercive force measured in oersteds or gilberts per centimeter. The values under the heading Bx are the values of residual flux measured in gausses.

Cobalt steel may also be employed although the coercive force is somewhat lower than in the case of the materials previously mentioned. For example, in the case of 36% cobalt steel, the coercive force is approximately 240 oersteds and the residual magnetism approximately 9,600 gausses and in the case of 42% cobalt steel the coercive force is approximately 235 oersteds and the residual magnetism is approximately 10,700 gausses.

The high coercive force materials in themselves are not a part of my present invention. Some of these and other high coercive force materials are described in my own and other patents including Patents Nos. 1,633,805, 1,947,274, 1,989,551, 1,968,569, 2,027,994, 2,027,995, 2,027,996, 2,027,997, 2,027,998, 2,027,999 and 2,028,000.

The yoke 15 may be composed of highly permeable material such as nickel-iron alloy, with a composition, for example, of 78½% nickel and the remainder iron, or 46–48% nickel and the remainder iron. However, I have found it satisfactory to use an ordinary soft iron, such as cold-rolled steel, for example. All of these materials have relatively low coercive force.

The permanent magnets 16 and 17 may be secured to the side 24 of the yoke 15 in any suitable manner, for example, by means of bolts or rivets. Owing to the hardness of the permanent magnet material, if screw fastenings or rivets are to be utilized it is preferable to cast bushings or studs for them into the ends of the magnets when they are formed. For example, in the arrangement illustrated in Fig. 9 rivets 37 are cast into the ends of the magnets 16 and 17 when the magnets are produced and heads 38 are formed on the rivets after the assembly of the magnets to the piece 24. Before assembling the magnets to the piece 24 a heavy current may be passed through the rivets 37 in order to bring them to a red heat, whereupon they are inserted into countersunk holes in the piece 24 and pressed to form the heads 38.

In order to produce damping magnet systems like the damping magnet system 13 with great rapidity and with uniform accuracy of air gap I utilize the following method of manufacture. The damping magnets 16 and 17 (see Fig. 9) are secured to the side piece 24 of the yoke 15 in the manner just described before the piece 24 is joined to the open loop 25. The open loop 25 may be bent to shape in any suitable manner as by means of forming dies. A surface 19 is then accurately finished to a plane surface by means of grinding, for example. The pole faces 20 and 21 of magnets 16 and 17, respectively, are also ground to form portions of a common plane.

The stepped edges 26 and 27 may be machined to the proper dimensions in any desired manner and a spacer 39 is then brought against the surface 19 on the inside of the portion 18 of the yoke 15, whereupon the piece 24 is inserted in the opening in the loop 25 with the pole faces 20 and 21 in contact with the lower side of spacer 39. The adjacent ends 26 and 27 of the cold-rolled steel pieces are then joined as by means of welding, whereupon the spacer 39 may be removed. In this manner accurate, uniform, parallel, air gaps are obtained, and it is unnecessary to utilize very thin grinding wheels as in the case of single unitary C-shaped permanent magnets, thus avoiding the expense and breakability of such thin grinding wheels and also the difficulty of maintaining them at accurate thickness. It will be understood that the spacer 39 is of a thickness corresponding to the desired air gap. For example, in the apparatus illustrated a .075 inch spacer may be employed to produce a .075 inch air gap in connection with permanent magnets having axial lengths of ⅞ of an inch and distances between planes of opposite pole faces of approximately 1⅜ of an inch. Since the permanent magnets 16 and 17 are composed of high coercive force material, the ratio of length of permanent magnet or length of high coercive force material to length of air gap may be made relatively small, 11⅔ to one in the case illustrated. In other words, the air gap may be made relatively large thus minimizing difficulties in the design, assembly and operation of the watt-hour meter. It may also be mentioned that, in the apparatus illustrated by way of example, the long dimension of the loop forming the yoke 15 measured between portions 35 and 36 is approximately 4 inches, the thickness of the material forming the loop 25 is approximately ⅛ of an inch, the thickness of the piece 24 is approximately 13⁄64 of an inch, the width of the pieces 25 and 24 being 1⅜ of an inch, and the disc diameter is approximately 3½ inches for the single element meter, Fig. 6, or approximately 4 inches for the two-element meter, Fig. 7.

The construction of the damping magnet system illustrated in the drawings lends itself readily to having the permanent magnets magnetized after the damping magnet system is fully assembled. It is generally desirable that composite magnet systems should be magnetized after they are completely assembled for the reason that permanent magnets tend to require a continuous keeper circuit in order that they will retain their full strength of magnetization. This problem, of course, is not so great in the case of high coercive force magnetic material. For the purpose of magnetizing the permanent magnets 16 and 17 I provide a source of exceedingly strong magnetic flux such as an electromagnet 41, having a large number of turns, not shown, carrying a direct current and having a pair of pole pieces 42 and 43 of highly permeable magnetic material shaped to fit the lower surface of the lower side 24 of the damping magnet system (Fig. 5). Preferably I provide also a block 44 composed of highly permeable magnetic material which may be placed upon the upper surface of the top side 18 of the damping magnet. It will be understood that the strength of the magnetizing electromagnet is so great that the flux produced thereby saturates all portions of the loop 15 and therefore, the magnetic flux of the magnetizing electromagnet passing from the pole piece 42, through the permanent magnet 16 to the block 44, back through the permanent magnet 17 remains almost entirely unaffected by the presence of the magnetic material in the loop 15. Various paths of magnetic flux are shown in Fig. 5, but that part of the flux which passes through the magnets 16 and 17 is sufficient to saturate them. With a damping magnet system having dimensions such as that previously mentioned, I find that the permanent magnets may be successfully magnetized with an electromagnet providing a magnetizing force of approximately 6000 oersteds measured in the air gap. If it were not for the presence of the yoke 15, 2000 oersteds would probably be sufficient to magnetize the magnets to the maximum value of residual induction.

For the sake of stability the magnets 16 and 17 may be demagnetized or "knocked down" slightly by afterwards applying a smaller reversed magnetic potential between the pole pieces 42 and 43, or by placing the damping magnet system in an alternating current coil or demagnetizer such as shown in Fig. 11. Preferably, the demagnetizing magneto-motive force is approximately that required to produce a 5% reduction in the strength of the permanent magnets which would correspond to a 10% reduction in the damping torque. In apparatus with the dimensions illustrated, and using a 60-cycle source, this involves placing the damping magnet system in an alternating field having a peak value in the permanent magnets of approximately 370 ampere turns per inch of magnet length, or 183 oersteds or gilberts per centimeter. The damping magnet system 13 is so placed in the demagnetizer that flux passes through the permanent magnets in a direction transverse to planes through the front or back edges of the yoke 15 or parallel to the axis of the screw 29. I find that such a transverse alternating flux of sufficient value evidently produces enough rearrangement of the molecules to effect the desired demagnetization for stability.

It will be understood, of course, the demagnetizer must be a relatively powerful coil owing to the fact that, until saturated, the yoke 15 diverts a portion of the magnetic field from the magnets 16 and 17. I have found that a coil with a maximum intermittent rating of 10,000 ampere turns and two-inch axial length is sufficient for magnetic systems of the dimensions specified in the illustrative example. The magnet system 13 is withdrawn from the demagnetizer gradually before turning off the current in order to taper off the alternating field applied to the magnets.

In cases where permanent magnet material of exceptionally high coercive force is to be employed or where the permanent magnets are larger than usual, it may be necessary or desirable to employ a magnetizing device such as that illustrated in Fig. 10 having two C-shaped portions 45 and 46 carrying windings supplying flux to pole pieces 42, 43 and 44.

The damping magnet system 13 may be secured to the stationary structure of the watt-hour meter in which it is to be employed in any suitable manner, for example, by means of a screw cooperating with a threaded hole 34 in the lower side 24 of the yoke 15. The damping effect of the damping magnet system may be adjusted in any well-known manner such as by means of a movable flux shunt or by sliding the entire damping magnet system in one direction or the other along a line intersecting the axis of the rotating disc 11. For example, the meter frame 8 or 10 may be provided with a slotted shelf 47, and a large headed screw 48 may be provided with the end threaded into the hole 34 in the yoke of the damping magnet and with the head abutting the lower surface of the shelf 47. To facilitate the maintenance of the damping magnet system in a perpendicular relationship to its line of travel transverse lugs 49 may be formed in the lower side 24 of the yoke 15. The lugs 49 are of such a width as to form a sliding fit in the slot of the shelf 47.

For fine adjustment of the braking torque a differential screw 29 may be provided having a threaded portion 30 with a coarse pitch, and a threaded portion 31 with a fine pitch, the portion 30 being threaded into a non-magnetic crosspiece 32 secured to the lower portion 24 of the yoke 15 in any suitable manner as by means of screws 33. The fine pitch portion 31 may be threaded in a bracket 60 forming a portion of the meter frame 8 or 10.

The principle of operation of induction type watt-hour meters is well-known to those skilled in the art, the driving torque on the disc 11 being due to the shifting magnetic field set up by the currents flowing in the coils of the driving units, and the restraining or damping torque being produced by flux crossing the air gap 14 and setting up eddy-currents which react with the flux to oppose the rotation of the disc 11. The paths of magnetic flux produced by the magnets 16 and 17 are shown in Fig. 4. The principal path crosses air gaps 14. It may be traced from the upper pole face of one of the permanent magnets, in this case, the permanent magnet 16 represented as having north polarity at the upper pole face, across the left-hand air gap 14, through the upper flat portion 18 of the loop 15, down across the right-hand air gap 14 to the south pole face at the upper end of the permanent magnet 17, through the permanent magnet 17, through the lower side 24 of the loop 15 and back up through the permanent magnet 16. Similarly, leakage fluxes also travel through the air gaps 14 and the outer paths provided by the curved portions 35 and 36 of the loop 15. The flux in paths 35 and 36 will, however, be considerably less owing to the greater length of these magnetic paths. Substantially all the useful flux of the magnets 16 and 17 passes through the shielding yoke 15 which increases the strength of the magnet system by practically eliminating unused leakage flux or stray flux.

There are two effects in watt-hour meter damping magnets which may interfere with constancy of calibration of the meters; the first is inherent aging or gradual weakening of the permanent magnets, the second is weakening due to magnetic disturbances. Meters installed under practical conditions on electric supply lines to serve central station customers are subjected to two classes of magnetic disturbances. In the first of these, a short circuit occurs on the load side of the meter (that is on the consumer's side) which may cause a transient current of from one hundred to even one thousand or more times the rated current of the meter to flow through the current coils before the fuses or breakers can interrupt the circuit (depending upon the short circuit capacity of the supply system and the severity of the short circuit). In the second of these classes of magnetic disturbances, the meter is subjected to a transient over-voltage of very short duration, usually because of a surge caused by lightning. These lightning surges may be of all magnitudes up to a value sufficient to burn up the meter or break down the insulation, but many such surges are insufficient to do this and dissipate themselves by causing abnormally large transitory currents in the meter windings. When either one or a combination of the above two classes of abnormal surges occur, strong magnetic fields are set up around the meter coils and their core structures may become completely saturated, causing strong leakage fields. These transient fields may be of the order of hundreds or even thousands of times the normal value of the leakage fields to which the damping magnets are subjected in usual operations.

Heretofore, in watt-hour meters arranged as in Fig. 6 with a cast iron frame 10, the frame has provided some shielding against magnetic disturbances. However, the cast-iron frame provided inadequate protection since it saturated readily. In two-element meters such as in Fig. 7 with an aluminum frame 8 it was necessary to provide special expensive magnet shielding systems for the damping magnets or the meter coils owing to the even closer proximity between driving units and damping magnets and the fact that doubling the number of coils and applying three-phase current thereto tripled the severity of magnetic fields produced by surge currents.

In my apparatus, however, owing to the properties of the material of which the permanent magnets 16 and 17 are composed and the fact that they have been "knocked down," they retain their magnetism with great constancy and watt-hour meters utilizing my damping magnet retain their accuracy practically indefinitely. This is true even though a very heavy abnormal field should be produced in the vicinity of the damping magnet. In my construction, the permanent magnets 16 and 17 are surrounded by low coercive force magnetic material and therefore, for practical purposes are fully shielded from extraneous magnetic fields. Any magnetic field having a component parallel to the line of magnetization of either of the permanent magnets 16 or 17 will pass flux produced thereby through the low coercive force loop 15 rather than through the permanent magnets 16 and 17. Likewise any field passing from right to left or vice versa, that is, in the direction of the greatest dimension of the yoke 15, will pass flux through low coercive force material rather than through the permanent magnets. Even a magnet field from front to back of the meter or vice versa, that is, in a direction parallel to the axis of the screw 29 will be partially diverted to the yoke material owing to its low coercive force. My damping magnet construction is particularly compact, economical and efficient for the reason that the yoke member 15 serves the three-fold purpose of supporting the permanent magnets, acting as keeper, armature or magnetic return, and shielding the permanent magnets.

For practical purposes any extraneous magnetic field which may reasonably be expected can not pass flux through the permanent magnets owing to the shielding effect of the yoke 15. But if, as a result of sufficiently great fields, such as those comparable in strength with the fields utilized for initially magnetizing the permanent magnets, the material of the yoke 15 should approach saturation, the permanent magnets 16 and 17 would be subjected to a field that might be demagnetizing. However, such great extraneous fields need not reasonably be expected.

The effectiveness of my shielding yoke is illustrated by short circuit tests which I have made on three-phase two-element meters of the type illustrated in Fig. 7 and having a rating of five amperes. The samples tested had a four-inch disc with the two driving units and the damping magnet arranged about 120 degrees apart as shown in Fig. 14, so that the damping magnets were less than four inches from the centers of both driving units. Short circuits were applied through the current coils in series, connected to a 30-ampere rated cartridge type fuse and excited from a 440 volt, 250 kv.-a. 60-cycle power transformer. The maximum peak short circuit current of numerous tests under these conditions was about 4200 amperes. The meter calibration was checked before and after the application of the short circuits and the increase in meter speed taken as a measure of the "knock down" due to the surge.

With the piece 25 having a thickness of $\frac{3}{16}$ inch the magnets were "knocked down" from .2 to .3% but when the yoke of the same magnet system was ground down to $\frac{1}{8}$ inch the "knock down" was approximately .7%. On the other hand, when the magnet system was replaced with one having the piece 25, $\frac{3}{32}$ inch in thickness, there was no perceptible "knock down." When the same test was made on meters of the same type except for having unshielded chrome-steel damping magnets of the shape illustrated in Patent No. 1,706,171, Kinnard, the magnets were "knocked down" about 8.7%.

It is apparent that the use of partially demagnetized high coercive force material and my shielding yoke 15 both contribute to providing a high degree of meter constancy, but that the use of high coercive force material alone is not enough to eliminate the effect of magnetic disturbances. The fact that there was a perceptible increase in "knock down" when the yoke thickness of my construction was made less than $\frac{3}{16}$ inch shows the importance of providing my shielding member even with high coercive force material. Although my invention is not limited to the use of specific dimensions, in a watt-hour meter having the other illustrative dimensions given, I now consider the $\frac{3}{16}$ inch yoke as the best from a commercial standpoint considering both economy and obtaining sufficient shielding effect.

In the case of very rapid or steep wave-front surges, such as are most likely to occur owing to lightning strokes, my yoke 15 also provides shielding by virtue of its current conducting property. It appears that the magnitude of surge current necesasry to cause magnet "knock down" increases rapidly as the speed of the impulse increases, owing to magnetic shielding due to eddy-currents.

In case the strength of the stray field should exceed the expected value so far as to saturate the yoke 15, protection is still provided by reason of the high coercive force of the permanent magnets and the fact that they have been "knocked down." This may be seen from the characteristic curve of the material. Fig. 12 illustrates the characteristic curves of various permanent magnet materials. The curves 53, 54 and 55 illustrate the portions of the hysteresis curves in the second quadrant, that is, the demagnetization curves of three different permanent magnet materials. Curve 53 applies to a nickel, aluminum, cobalt alloy of iron with approximately the proportions of the material identified as grade 1 in the tabulation of page 2. Curve 54 applies to 36% cobalt steel and curve 55 to the previously commonly employed chromium permanent magnet steel. The curves 56, 57 and 58 represent the corresponding available energy curves of the materials represented by curves 53, 54 and 55, respectively.

The energy stored in a magnetic circuit is proportional to the product of magnetic flux and field strength and the available energy curves of Fig. 12 are obtained by plotting the products of the ordinates and abscissae for various points on the demagnetization curves. It will be seen that the aluminum, nickel, cobalt, iron alloy not only has the highest available energy but also may be subjected to the greatest demagnetizing field without falling below the point of maximum available energy.

The effect of "knock down" in the case of the material represented by curve 53 is also shown in the graph of Fig. 12. Characteristic curves such as curves 53, 54 and 55 represent the characteristics of the magnet material itself independent of conditions other than strength of demagnetizing field and accordingly these curves are obtained by tests on samples in the form of closed complete magnetic circuits with coils carrying gradually varied direct current to produce the magnetic field. The introduction of an air gap in the magnetic circuit results in a demagnetizing force dependent in magnitude upon the relative reluctance of the air gap and upon the shape of the magnetic circuit, which affects the amount of leakage and the ratio of fluxes in the magnet and the air gap. In the case of a damping magnet system such as illustrated in Fig. 2, I find that the reluctance of the air gap 14 exerts a demagnetizing force bringing the fully saturated magnet material from the point C to the point $C_1$, on the curve 53. The line OG found by drawing a line through the origin and the point $C_1$, thus becomes in effect the zero axis with respect to variations in applied magnetic field. The line OG may be called the open circuit zero-field axis. If the magnet material after having been fully saturated as explained in connection with Fig. 5 is then subjected to an external demagnetizing field the material is brought down the curve 53 to some point such as the point A depending upon the strength of the demagnetizing field. A reversal of the external field then carries the material along the lower side of the hysteresis loop 59 instead of along the curve 53 as is well understood by those skilled in the art, and a subsequent reversal carries the material down on the upper side of the hysteresis loop 59. Continued application of an alternating field of the same peak value merely causes the hysteresis loop 59 to be retraced repeatedly. The loop 59 is drawn to represent approximately the alternating "knock down" required to weaken the permanent magnets 5% from the open circuit value. Owing to the effect of eddy-currents and other factors present when alternating current is used, only a portion of the alternating field is effective in producing hysteresis and I have found approximately 180 oersteds, peak value of 60-cycle alternating field in the magnet material, are required to produce the hysteresis loop 59, in which the component of field producing hysteresis and demagnetization has a peak of approximately 100 oersteds. The loop 59 can, of course, be only illustrative of the action because different portions of the magnet material may be subjected to different fields owing to the partial effectiveness of the shielding loop 15 even when saturated.

The hysteresis loop 59 gradually shrinks as the magnets are withdrawn from the demagnetizing A. C. field until the point B on the zero line OG is reached when the field has been removed entirely. The point B represents about 5500 gausses flux density or approximately 5% less than the open circuit saturated value of point $C_1$. Any subsequent application of a demagnetizing field to the permanent magnet not exceeding approximately 100 oersteds, effective, or 180 oersteds, 60-cycle total, in the magnet material will simply cause the material to trace through some other intermediate hysteresis loop within the area represented by the loop 59 shrinking to the point B as the external field dies out, thus leaving the magnet strength unaffected.

Since the damping magnet systems are fully surrounded by low coercive force material there can be no so-called adjacency errors. No matter how close another watt-hour meter may be placed to a watt-hour meter having a damping magnet structure, in accordance with my invention there can be no interaction between the fields of the permanent magnets which might tend to change the calibration in the case of unshielded damping magnet systems.

For the purpose of adjusting the braking torque of a damping magnet system in connection with the calibration of the meter, the yoke 15 (Fig. 8) is moved along the shelf 47 after loosening the screw 48. A minimum damping effect will obviously be produced with the damping magnet system closest to the spindle 12 and a maximum damping effect will be produced with the damping magnet system slid out as far from the spindle 12 as possible without causing the front edges of the faces 20 and 21 of the permanent magnets 16 and 17 to go beyond the edge of the disc 11.

The shunt 28 provides temperature compensation in the manner described in Kinnard Patent No. 1,706,171 by shunting more or less of the magnetic flux as the temperature falls or rises.

In cases where it is considered necessary to economize in weight, material or space I may utilize what amounts to only one half the damping magnet system illustrated in Figs. 1 to 11. For example, in the arrangement of Fig. 13 there is a substantially U-shaped yoke 61 composed of low coercive force material having one end 62 set in slightly to form a pole piece and having a single permanent magnet 16 secured to the inner surface of the other end. A temperature compensating shunt 63 may be employed which may take the form of substantially one half the trapezoidal shaped compensating shunt 28 of Figs. 1 and 2. However, the upper surface 64 of the compensating shunt 63 is preferably substantially flush with the pole face 20 of the magnet 16. The temperature compensating shunt in this case operates by causing the flux crossing the disc 11 to be spread to a less or greater extent as the temperature falls or rises, thus adjusting the damping torque with variations in strength of the permanent magnet since the greatest damping torque is produced with a concentrated flux. With a flush type compensating shunt 63 of the type described it is obviously not necessary to have the shunt occupy the position shown, as it may be mounted adjacent the permanent magnet 16 at any other edge of the pole face thereof. The shunt 63 may be mounted at the edge of the pole face toward the center of the disc 11 in order that variations in temperature will produce variations in the distance between the center of damping flux and the center of the disc.

In Fig. 2 I have illustrated permanent magnet units 16 and 17 each of which is an integral unit and has its air gap at an end thereof in proximity to the side 18 of the low coercive force loop 15. It will be understood, however, that my invention is not limited to this precise arrangement and includes, for example, an arrangement in which the air gap is intermediate the ends of the permanent magnet unit in which case, of course, the metal in each permanent magnet unit would not be integral, but would be composed of two parts. For example, in the modification illustrated in Fig. 15 one permanent magnet unit consists of the parts 16 and 16' with the intermediate air gap 14a, and the other permanent magnet unit consists of the parts 17 and 17' with the intermediate air gap 14b. The arrangement of Fig. 15 may be found advantageous in cases where it is desirable to have an exceptionally large air gap as it facilitates providing a greater axial length of permanent magnet unit. For example, I may make damping magnet systems in accordance with the modification illustrated in Fig. 15 with a tenth-inch air gap without any sacrifice in damping strength or in stability.

I have herein shown and particularly described certain embodiments of my invention and certain methods of operation embraced therein for the purpose of explaining its principle and showing its application but it will be obvious to those skilled in the art that many modifications and variations are possible and I am, therefore, to cover all such modifications and variations as fall within the scope of my invention which is defined in the appended claims.

What I claim as new and desire to secure by Letters Patent of the United States, is:

1. A damping magnet system for rotating disc devices comprising a continuous closed member composed of cold-rolled steel and in the form of an elongated loop with sides flattened, a pair of relatively short permanent magnets composed of a high coercive force alloy in which iron, nickel and aluminum predominate in the order named, each of said magnets having one pole face against the inner surface of one of the flattened sides of said loop and the other pole face parallel to and spaced from the inner surface of the other flattened side of said loop to form an air gap in which a rotatable disc is adapted to move, both magnets being integrally joined to the same side of the loop but having pole faces of opposite polarity adjacent thereto.

2. A damping magnet system for rotating disc devices comprising a continuous closed member composed of relatively low coercive force magnetizable material in the form of an elongated loop with sides flattened, a pair of relatively short permanent magnets composed of relatively high coercive force material, each of said magnets having one pole face against the inner surface of one of the flattened sides of said loop and the other pole face parallel to and spaced from the inner surface of the other flattened side of said loop to form an air gap in which a rotatable disc is adapted to move, both magnets being joined to the same side of the loop but having pole faces of opposite polarity adjacent thereto, the ends of said magnets adjacent the air gap being inclined toward each other, and a temperature compensating shunt composed of negative temperature coefficient of permeability material extending between the side surfaces of said permanent magnets at the ends thereof toward the air gap.

3. A damping magnet system for rotating disc devices comprising a yoke composed of relatively low coercive force magnetizable material with portions having parallel opposite inner surfaces, and a permanent magnet composed of high coercive force material transversely mounted within said yoke having a pole face parallel to and spaced from one of the said inner surfaces to form an air gap, and a pole face of opposite polarity against the opposite inner surface of said yoke, whereby the yoke completes the magnetic circuit of the magnet and carries substantially all the useful flux of the magnet as well as shielding it.

4. A damping magnet system for rotating disc devices comprising a continuous closed member composed of relatively low coercive force magnetizable material in the form of an elongated loop with sides flattened, a pair of relatively short permanent magnets composed of high coercive force magnetic material and mounted transversely within said loop, each of said magnets having one pole face against the inner surface of one of the flattened sides of said loop and the other pole face parallel to and spaced from the inner surface of the other flattened side of said loop to form an air gap in which a rotatable disc is adapted to move, both magnets being joined to the same side of the loop but having pole faces of opposite polarity adjacent thereto.

5. A damping magnet system for rotating disc devices comprising a continuous closed member composed of relatively low coercive force magnetizable material in the form of an elongated loop with a flattened side, a permanent magnet composed of high coercive force magnetizable material transversely mounted within said loop having a pole face parallel to and spaced from the inner surface of one of the flattened sides of said loop to form an air gap and a pole face of opposite polarity against the inner surface of the opposite side of the loop and joined thereto.

6. A watt-hour meter having a continuously rotatable disc and an electromagnetic circuit having current and voltage windings subject to abnormal surges, a damping magnet system in close proximity to said windings, having a magnetic circuit including an air gap in which the disc rotates, and comprising a yoke composed of relatively low coercive force magnetizable material with portions having parallel opposite inner surfaces, and a permanent magnet composed of high coercive force material transversely mounted within said yoke having a pole face parallel to and spaced from one of the said inner surfaces to form the said air gap for the disc, and having a pole face of opposite polarity against the said opposite surface of said inner yoke, whereby the yoke completes the magnetic circuit of the magnet and carries substantially all the useful flux of the magnet as well as shielding it.

7. A damping magnet system for rotating disc devices comprising a continuous closed loop of low coercive force flat strip magnetizable material and a pair of bar magnet units each extending transversely across said loop from the inner surface of one side of the loop toward the inner surface of the other side of the loop, with pole faces of opposite polarity against one of said inner surfaces, said bar magnet units comprising high coercive force material and aligned air gaps extending transversely thereto.

8. A damping magnet system for rotating disc devices comprising a continuous closed loop of low coercive force flat strip magnetizable material, a permanent magnet unit extending transversely across said loop from the inner surface of one side of the loop toward the inner surface of the other side of the loop, said magnet unit being composed of high coercive force material and having an air gap extending transversely thereto.

9. A damping magnet system for rotating disc devices comprising a yoke composed of relatively low coercive force magnetizable material with portions having confronting opposite inner surfaces, and a permanent magnet unit extending transversely across said loop between said opposite inner surfaces, said permanent magnet unit comprising high coercive force material and an air gap extending transversely thereto, said loop thus completing a magnetic circuit of the magnet and carrying substantially all the useful flux of the magnet as well as shielding it.

10. A damping magnet system for rotating disc devices comprising a continuous closed loop of low coercive force flat strip magnetizable material and a pair of permanent magnet units each extending transversely across said loop from the inner surface of one side of the loop to the inner surface of the other side of the loop with pole faces of opposite polarity against one of said inner surfaces, said permanent magnet units comprising high coercive force material and aligned air gaps intermediate the ends of said units extending transversely thereto.

11. A damping magnet system with a permanent magnet and an air gap both encircled by a closed loop composed of low coercive force magnetizable material to which the magnet is attached, said loop serving as a support for the magnet to fix the air gap, as a magnetic shield for the magnet, and as a return path for magnet flux produced by the magnet.

HAROLD T. FAUS.